United States Patent
Shu

(10) Patent No.: US 11,410,435 B2
(45) Date of Patent: Aug. 9, 2022

(54) GROUND MARK EXTRACTION METHOD, MODEL TRAINING METHOD, DEVICE AND STORAGE MEDIUM

(71) Applicant: TENCENT TECHNOLOGY (SHENZHEN) COMPANY LIMITED, Guangdong (CN)

(72) Inventor: Mao Shu, Shenzhen (CN)

(73) Assignee: TENCENT TECHNOLOGY (SHENZHEN) COMPANY LIMITED, Shenzhen (CN)

(*) Notice: Subject to any disclaimer, the term of this patent is extended or adjusted under 35 U.S.C. 154(b) by 99 days.

(21) Appl. No.: 16/997,439

(22) Filed: Aug. 19, 2020

(65) Prior Publication Data

US 2020/0380272 A1 Dec. 3, 2020

Related U.S. Application Data

(63) Continuation of application No. PCT/CN2019/081208, filed on Apr. 3, 2019.

(30) Foreign Application Priority Data

May 7, 2018 (CN) .......................... 201810427093.4

(51) Int. Cl.
*G06T 7/00* (2017.01)
*G06V 20/56* (2022.01)
(Continued)

(52) U.S. Cl.
CPC .............. *G06V 20/588* (2022.01); *G06T 7/50* (2017.01); *G09B 29/007* (2013.01); *G06T 2207/20081* (2013.01); *G06T 2207/20084* (2013.01)

(58) Field of Classification Search
CPC .... G06V 20/588; G06V 10/82; G06V 20/582; G06V 20/63; G06T 7/50;
(Continued)

(56) References Cited

U.S. PATENT DOCUMENTS

2016/0187144 A1* 6/2016 Modica ..................... G01S 5/16
382/154

FOREIGN PATENT DOCUMENTS

CN 103207634 A 7/2013
CN 104166861 A 11/2014
(Continued)

OTHER PUBLICATIONS

Communication dated Jul. 2, 2020, from the State Intellectual Property Office of the P.R.C in application No. 201810427093.4.
(Continued)

*Primary Examiner* — Ping Y Hsieh
(74) *Attorney, Agent, or Firm* — Sughrue Mion, PLLC

(57) ABSTRACT

A ground mark determining method and apparatus are provided. The method includes: obtaining, by the computer device, a point cloud grayscale image, the point cloud grayscale image comprising a road segment map; obtaining, by the computer device, ground mark information from the road segment map and running a mark-extraction network model to extract ground marks in the road segment map, the ground mark information comprising information about the ground marks extracted by the mark-extraction network model, and the ground marks indicating driving information marked on a road segment surface; and determining, by the computer device, a target ground mark from the ground marks according to the ground mark information.

20 Claims, 7 Drawing Sheets

(51) Int. Cl.
*G06T 7/50* (2017.01)
*G09B 29/00* (2006.01)

(58) Field of Classification Search
CPC ... G06T 2207/20081; G06T 2207/20084; G09B 29/007; G09B 29/003; G06K 9/6271
See application file for complete search history.

(56) References Cited

FOREIGN PATENT DOCUMENTS

| CN | 105260699 A | 1/2016 |
|---|---|---|
| CN | 106683530 A | 5/2017 |
| CN | 106842269 A | 6/2017 |
| CN | 106951847 A | 7/2017 |
| CN | 107194957 A | 9/2017 |
| CN | 107403163 A | 11/2017 |
| CN | 108564874 A | 9/2018 |
| WO | 2009035697 A1 | 3/2009 |
| WO | 2011/065399 A1 | 6/2011 |
| WO | 3171292 A2 * | 5/2017 |

OTHER PUBLICATIONS

Communication dated Mar. 5, 2021, from the European Patent Office in application No. 19799124.3.
Written Opinion of the International Searching Authority dated Jul. 9, 2019, in application No. PCT/CN2019/081208.
International Search Report of PCT/CN2019/081208 dated Jul. 9, 2019 [PCT/ISA/210].
Written Opinion of PCT/CN2019/081208 dated Jul. 9, 2019 [PCT/ISA/237].
Third Office Action of Chinese Application No. 201810427093.4 dated Jul. 2, 2020.

* cited by examiner

GROUND MARK EXTRACTION METHOD, MODEL TRAINING METHOD, DEVICE AND STORAGE MEDIUM

CROSS-REFERENCE TO RELATED APPLICATION(S)

This application is a continuation of PCT/CN2019/081208, filed on Apr. 3, 2019, and claims priority to Chinese Patent Application No. 201810427093.4, entitled "GROUND MARK EXTRACTION METHOD, MODEL TRAINING METHOD, DEVICE AND STORAGE MEDIUM," and filed with China National Intellectual Property Administration on May 7, 2018, which are incorporated by reference herein in their entireties.

BACKGROUND

1. Field

Embodiments of the disclosure relate to the field of computer technologies, and in particular, to a ground mark extraction method and apparatus, a model training method and apparatus, and a computer-readable storage medium.

2. Description of Related Art

A high-precision map is one of the main components in autonomous driving, which provides rich and accurate road information for the autonomous driving. Ground marks are the core elements of the high-precision map. The ground marks may include, for example, an arrow, a text, a pattern, and the like. The ground marks can assist a vehicle in performing accurate positioning, thereby helping the vehicle to make appropriate planning and decisions.

At present, extraction of the ground marks in the high-precision map mainly depends on manual editing. That is, in an editing tool of the high-precision map, finding out road segments containing the ground marks by manually viewing point cloud data or point cloud grayscale image data, manually drawing rectangular boundary boxes of the ground marks, and editing attributes of the ground marks such as type, shape and color.

Often, the road segments may not contain the ground marks because the ground marks in the high-precision map are distributed relatively sparsely. As such, the manual extraction method may be necessary to traverse all the road segments and find out the road segments containing the ground marks to be edited, which is a time-consuming and low efficiency process. Moreover, manual traversal is more prone to errors, and thus, the high-precision map may become less accurate.

SUMMARY

According to an embodiment, there is provided a ground mark determining method, performed by a computer device, the method including: obtaining, by the computer device, a point cloud grayscale image, the point cloud grayscale image comprising a road segment map; obtaining, by the computer device, ground mark information from the road segment map and running a mark-extraction network model to extract ground marks in the road segment map, the ground mark information comprising information about the ground marks extracted by the mark-extraction network model, and the ground marks indicating driving information marked on a road segment surface; and determining, by the computer device, a target ground mark from the ground marks according to the ground mark information.

According to an embodiment, there is provided a ground mark determining apparatus, including: at least one memory storing computer program code; and at least one processor configured to access the at least one memory and operate as instructed by the computer program code. The computer program code including: first obtaining code configured to cause the at least one processor to obtain a point cloud grayscale image, the point cloud grayscale image comprising a road segment map; second obtaining code configured to cause the at least one processor to obtain ground mark information from the road segment map and run a mark-extraction network model to extract ground marks in the road segment map, the ground mark information comprising information about the ground marks extracted by the mark-extraction network model, and the ground marks indicating driving information marked on a road segment surface; and determining code configured to cause the at least one processor to determine a target ground mark from the ground marks according to the ground mark information.

According to an embodiment, there is provided a non-transitory computer-readable storage medium storing computer program code configured to cause at least one computer processor to: obtain a point cloud grayscale image, the point cloud grayscale image comprising a road segment map; obtain ground mark information from the road segment map and run a mark-extraction network model to extract ground marks in the road segment map, the ground mark information comprising information about the ground marks extracted by the mark-extraction network model, and the ground marks indicating driving information marked on a road segment surface; and determine a target ground mark from the ground marks according to the ground mark information.

BRIEF DESCRIPTION OF THE DRAWINGS

The following description briefly introduces the accompanying drawings, which illustrate example embodiments of the disclosure. These and other aspects, features and advantages will become apparent from the following detailed description of example embodiments, which is to be read in conjunction with the accompanying drawings, in which.

DESCRIPTION

The following describes the embodiments of the disclosure with reference to the accompanying drawings. The embodiments described herein are only some rather than all of the embodiments ascertainable by one of ordinary skill in the art. All other embodiments obtained by a person of ordinary skill in the art based on the embodiments of the disclosure without creative efforts shall fall within the protection scope of the disclosure.

In addition, it may be readily apparent to a person of ordinary skill in the art that, with the development of computers and the emergence of new scenarios, the technical solutions provided in the embodiments are also applicable to similar technical problems.

According to an embodiment, a ground mark determining method is provided, which can determine ground marks in a map efficiently and accurately. The embodiments may also include corresponding apparatuses, a computer device and a computer-readable storage medium. Detailed descriptions are provided below.

Figure 1:
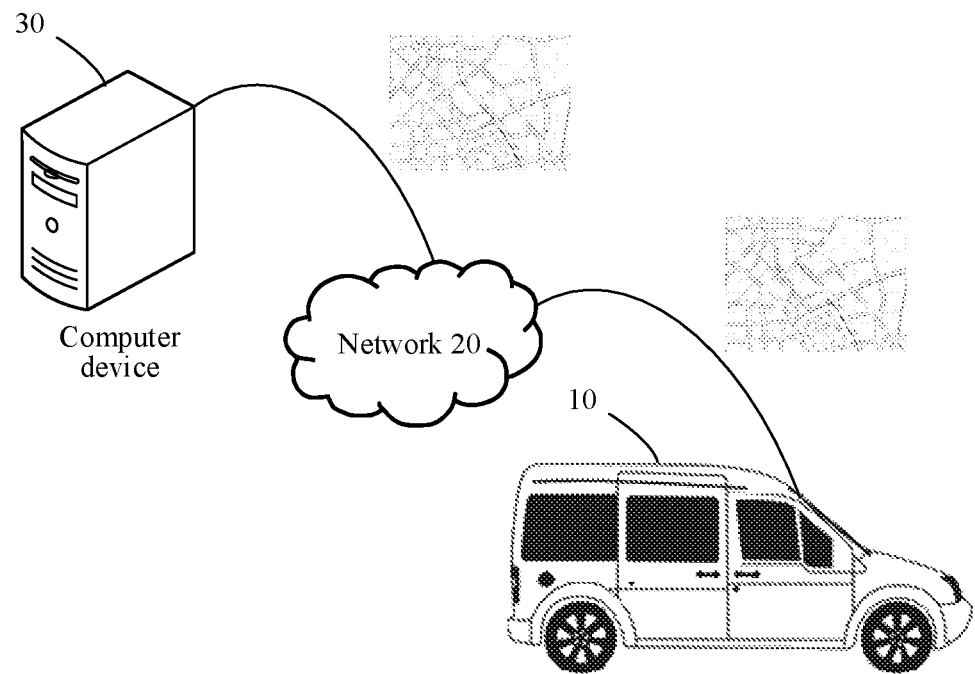
FIG. 1 is a schematic diagram of an autonomous driving system according to an embodiment.
Figure 2A:
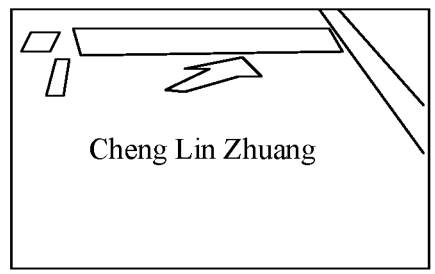
FIG. 2A to FIG. 2D are schematic diagrams illustrating some examples of ground marks.
Figure 2B:
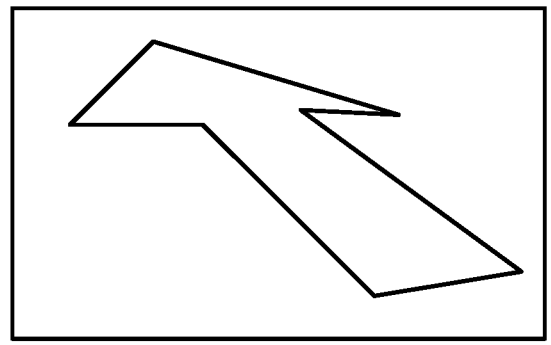
Figure 2C:
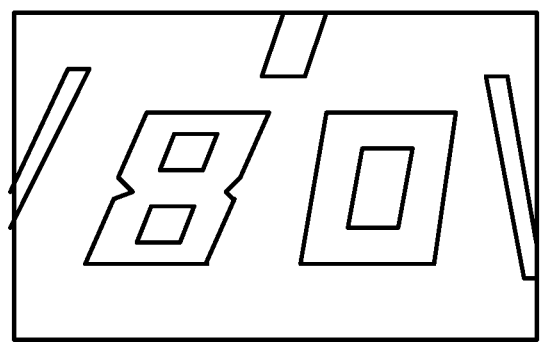
Figure 2D:
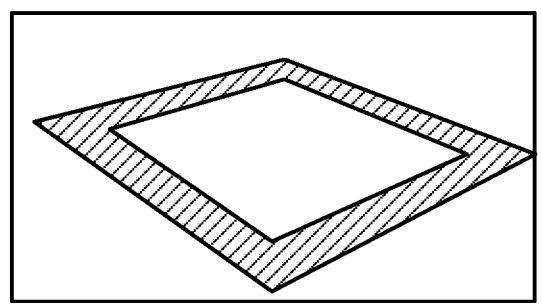

FIG. 1 is a schematic diagram of an autonomous driving system according to an embodiment.

The autonomous driving may also be referred to as unmanned driving, which means that a vehicle may run on a road without a driver or without an instruction from a driver in the vehicle.

As shown in FIG. 1, a vehicle 10 having an autonomous driving capability downloads a map used for the autonomous driving from a computer device 30 through a network 20. Here, the map in the scene of the autonomous driving may also be referred to as a high-precision map. The vehicle 10 having the autonomous driving capability makes driving planning and decisions in the autonomous driving process according to the downloaded high-precision map.

The autonomous driving process generally relies on the high-precision map, and especially to ground marks in the high-precision map, where the ground marks play an indication role in a running process of the vehicle. For example, referring to FIG. 2A to FIG. 2D, the ground marks may include a text, a digit, an arrow, a pattern, and the like. Any mark playing an indication role in driving on the ground can be understood as a ground mark.

To use the high-precision map for the autonomous driving, the ground marks may be displayed in the high-precision map. According to an embodiment, the ground marks may be determined in a process of making the high-precision map. Here, determining the ground marks mainly depends on a mark-extraction network model, and the mark-extraction network model may be a deep neural network model. The deep neural network model may be used for mark extraction needing to be trained in advance. The following first introduces a training process of the mark-extraction network model according to an embodiment, and then introduces a process of determining the ground marks according to an embodiment.

Figure 3:
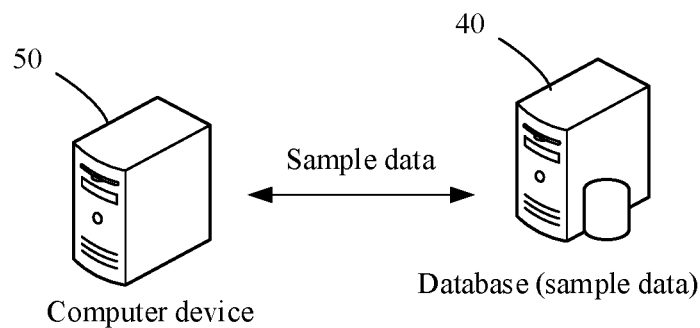
FIG. 3 is a schematic diagram illustrating a mark-extraction network model according to an embodiment.

The training process of the mark-extraction network model can be understood with reference to FIG. 3. As shown in FIG. 3, a database device 40 stores sample data for training a mark-extraction network model. The sample data is a large quantity of road segment maps, and each of the road segment maps may include ground marks that have been marked. A computer device 50 obtains a plurality of pieces of sample data from the database device 40, and trains an initial network model until the initial network model converges to obtain the mark-extraction network model used for recognizing ground marks.

Figure 4:
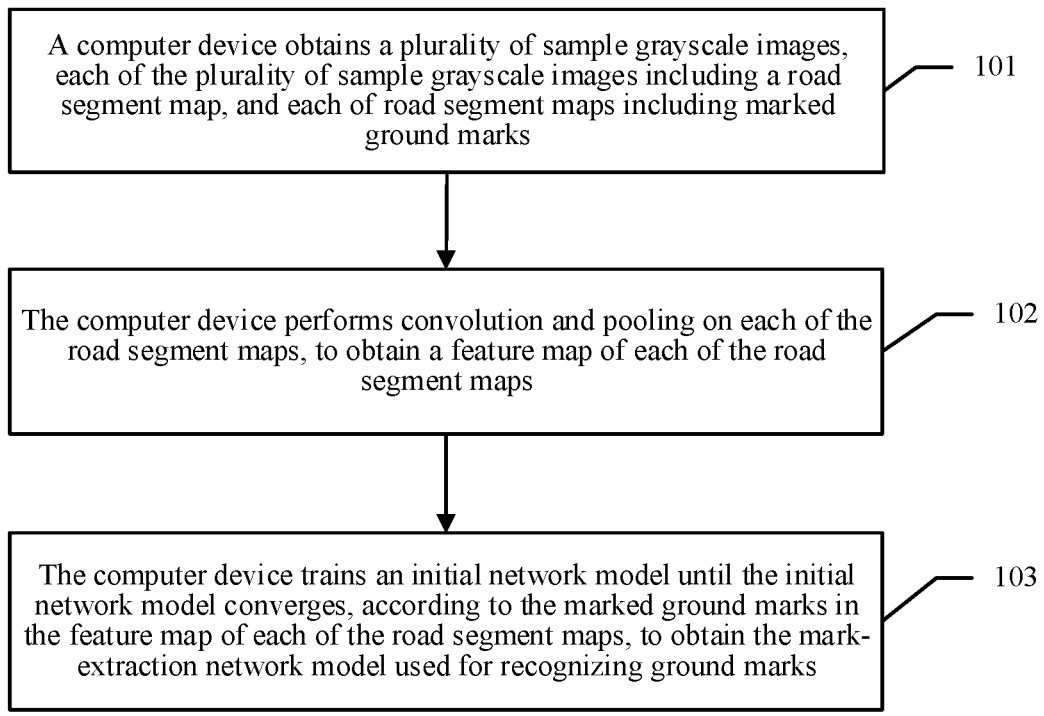
FIG. 4 is a flowchart of a method for training a mark-extraction network model according to an embodiment.

A method for training a mark-extraction network model according to the embodiments is described below with reference to FIG. 4. FIG. 4 is a flowchart of a method for training a mark-extraction network model according to an embodiment that includes the following steps.

In step 101, a computer device may obtain a plurality of sample grayscale images, each of the plurality of sample grayscale images including a road segment map, and the road segment map including marked ground marks.

The sample grayscale images are two-dimensional grayscale images.

The computer device 50 can directly obtain the sample grayscale images from the database device 40, or can obtain three-dimensional laser point cloud maps from the database device 40, and then convert the three-dimensional laser point cloud maps into the two-dimensional grayscale images.

A laser point cloud, also referred to as a point cloud, uses laser to obtain spatial coordinates of sample points on a surface of an object in the same spatial reference system, and obtains a set of massive points expressing target spatial distribution and target surface features. The set of points is referred to as "point cloud". Attributes of the point cloud include: spatial resolution, point location accuracy, surface normal vector, and the like.

The point cloud obtained according to a laser measurement principle includes three-dimensional coordinates (XYZ) and a laser reflection intensity.

The point cloud obtained according to a photogrammetry principle includes the three-dimensional coordinates (XYZ) and color information (RGB).

The point cloud obtained according to the laser measurement principle and the photogrammetry principle includes the three-dimensional coordinates (XYZ), the laser reflection intensity and the color information (RGB).

Some examples of obtaining laser point cloud data may include obtaining the laser point cloud data using vehicle-mounted laser, airborne laser, terrestrial laser scanning, and the like.

Figure 5:
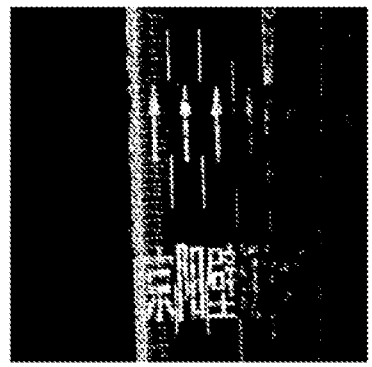
FIG. 5 is a schematic diagram of a point cloud grayscale image according to an embodiment.

The grayscale images are point cloud grayscale images, and the point cloud grayscale images will be described with reference to FIG. 5. As shown in FIG. 5, a point cloud grayscale image includes a road segment map, and the road segment map includes arrows and text. Here, the arrows and the text in the point cloud grayscale image are to be marked in advance. All road segment maps belong to point cloud grayscale images.

In step 102, the computer device may perform convolution and pooling on each of the road segment maps to obtain a feature map of each of the road segment maps.

The road segment map is divided into a plurality of road segment sub-maps, and the convolution and the pooling are performed on each of the plurality of road segment sub-maps to obtain a feature sub-map corresponding to each of the road segment sub-maps.

In step 103, the computer device may train an initial network model until the initial network model converges, according to the marked ground marks in the feature map of each of the road segment maps, to obtain the mark-extraction network model for recognizing ground marks.

The initial network model may also be trained until the initial network model converges, according to the marked ground marks in the feature map corresponding to each of the road segment sub-maps, to obtain the mark-extraction network model for recognizing the ground marks.

In this embodiment, considering that the size of the point cloud grayscale images is relatively large, in a model training process, the point cloud grayscale images, for the ease of processing by the initial network model, can be divided into a plurality of sub-images. For example, the point cloud grayscale image having a size of 512*512 can be divided into a plurality of sub-images. The structure of the initial network model can be understood with reference to FIG. 6.

Figure 6:
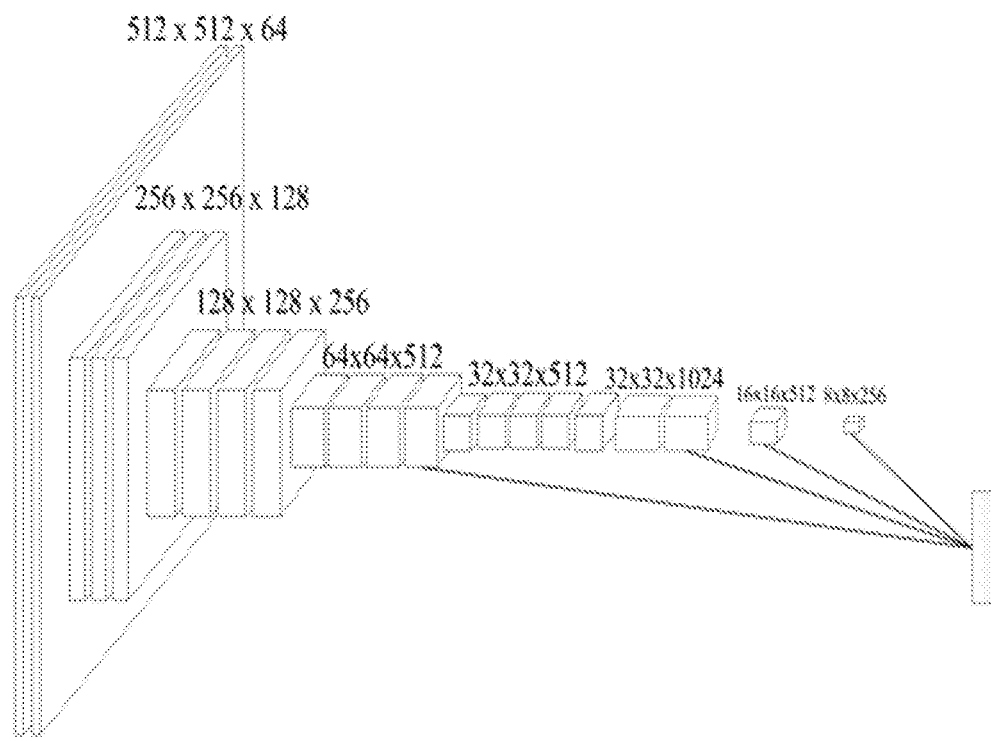
FIG. 6 is a schematic structural diagram of a mark-extraction network model according to an embodiment.

As shown in FIG. 6, for each of the point cloud grayscale images having the size of 512*512, 64 feature maps of 512*512 are obtained through two convolutional layers, and 128 feature maps of 256*256 are downsampled through a pooling layer. Then, 128 feature maps of 256*256 continue to be obtained through two convolutional layers and 256 feature maps of 128*128 are obtained through pooling. Next, 256 feature maps of 128*128 are obtained through three convolutional layers and 512 feature maps of 64*64 are obtained through pooling. Then, 512 feature maps of 64*64 continue to be obtained through three convolutional layers and 512 feature maps of 32*32 are obtained through pooling. Next, 1024 feature maps of 32*32 are obtained through three convolutional layers, and a pooling layer having a step of 1 is used for obtaining 512 feature maps of 32*32 without changing the size of the feature maps. Subsequently, 1024 feature maps of 32*32 are obtained through two dilated convolutional layers having a hole size of 6. Then, 512 feature maps of 16*16 and 256 feature maps of 8*8 are obtained through two convolutional layers.

In addition, extraction of the ground marks is performed through feature maps of 4 specific convolutional layers. First, for the selected feature maps, unknown parameters related to the position, the type, the shape and confidence levels of the ground marks in the images may be determined, and then the unknown parameters may be solved according to marked information about the ground marks in the samples to determine unknown quantities in the initial network model and obtain the mark-extraction network model for extracting the ground marks.

The model training solution provided according to this embodiment may train a deep neural network model for extracting the ground marks to efficiently and accurately extract the ground marks.

The above described training process of the mark-extraction network model, and the solution for determining ground marks according to the embodiments will be further described below.

Figure 7:
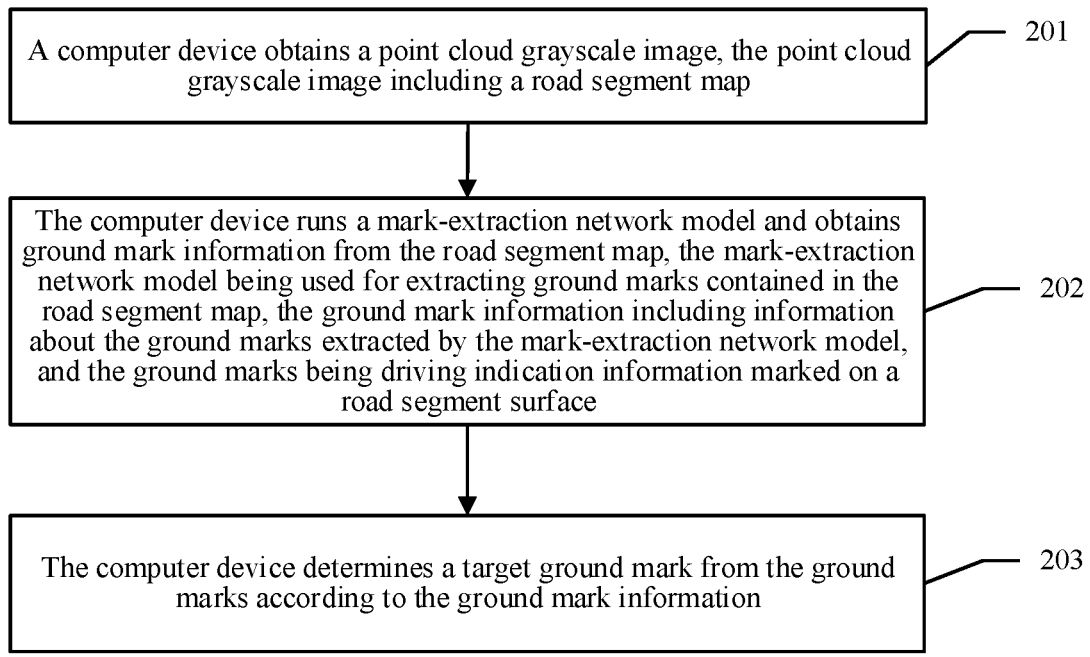
FIG. 7 is a flowchart of a ground mark determining method according to an embodiment.

FIG. 7 is a flowchart of a ground mark determining method according to an embodiment, in which the steps may include:

In step 201, a computer device may obtain a point cloud grayscale image, the point cloud grayscale image including a road segment map.

The point cloud grayscale image is described in the foregoing embodiments, and thus, will not be repeated again.

In step 202, the computer device may run or use a mark-extraction network model and obtain ground mark information from the road segment map. The mark-extraction network model is used for extracting ground marks included in the road segment map. The ground mark information includes information about the ground marks extracted by the mark-extraction network model, and the ground marks indicate driving information or direction marked on a road segment surface.

The structure and principles of the mark-extraction network model in this embodiment have been introduced in the foregoing embodiments of model training, and the mark-extraction network model may be understood according to the foregoing embodiments.

The ground marks can also be understood with reference to the descriptions of the foregoing embodiments.

In an embodiment, the ground mark information may include attribute information and confidence level of the ground marks; and the attribute information of the ground marks may include the type of the ground marks such as text, a digit, an arrow, and a pattern, and the attribute information of the ground marks can also include information on the shape, the position, and the like of the ground marks.

The confidence levels of the ground marks may refer to credibility of the ground marks.

Because a process of ground mark extraction may be affected by a plurality of factors such as image clarity and non-ground marks, the confidence level of the non-ground marks may not be high, and a filtration may be performed in this case according to the confidence levels to improve credibility of the ground marks.

In step 203, the computer device may determine a target ground mark from the ground marks according to the ground mark information.

In certain case, there may be wrong or repeated ground marks among the ground marks extracted by the mark-extraction network model. Therefore, the ground marks extracted by the mark-extraction network model may need to be processed subsequently to obtain a to-be-determined target ground mark.

The embodiments use the mark-extraction network model to obtain the ground mark information in the road segment maps, and determine the ground marks in the road segment maps according to the ground mark information in order to improve efficiency and accuracy of the ground marks in the road segment maps.

In addition, determining a target ground mark from the ground marks according to the ground mark information may include removing unqualified ground marks from the ground marks according to the confidence levels and the attribute information of the ground marks to obtain the target ground mark in a two-dimensional form; and converting the target ground mark in the two-dimensional form into a target ground mark in a three-dimensional form.

Here, the unqualified ground marks may include the wrong ground marks or repeated ground marks extracted by the mark-extraction network model.

A detection result of the ground marks based on two-dimensional images is two-dimensional, and needs to be converted into a three-dimensional form to be displayed in a high-precision map.

In addition, the attribute information includes position information and shape information. Furthermore, removing unqualified ground marks from the ground marks according to the confidence levels and the attribute information of the ground marks to obtain the target ground mark in a two-dimensional form may include: removing ground marks having confidence levels lower than a confidence level threshold according to the confidence levels of the ground marks; and performing, for ground marks having confidence levels higher than the confidence level threshold, deduplication on at least two ground marks including the same position information according to confidence levels and shape information of the at least two ground marks to obtain the target ground mark in the two-dimensional form.

In an embodiment, a confidence level lower than the confidence level threshold indicates that a ground mark may be extracted incorrectly, and a confidence level higher than the confidence level threshold may indicate correct extraction.

Incorrect detection results need to be filtered after the ground marks are extracted. Each of the detected ground marks has a corresponding confidence level, the detection results having confidence levels lower than the confidence level threshold are filtered, and the detection results having confidence levels higher than the confidence level threshold are kept. Then other incorrect detection results can also be filtered according to the type and the shape of detection boxes. For example, there are several fixed ratios of the length to the width of an arrow. In a case that there is a large difference between a detection result and the fixed ratios, the detection result is to be filtered out.

The ground marks having confidence levels higher than the confidence level threshold may further include the repeated ground marks, on which deduplication needs to be performed.

In addition, performing the deduplication on at least two ground marks including the same position information according to confidence levels and shape information of the at least two ground marks may include: calculating, for the at least two ground marks including the same position information, a confidence level difference between each of the at least two ground marks; deleting, for the at least two ground marks having a confidence level difference greater than a preset value, a ground mark having a lower confidence level; deleting, for the at least two ground marks having a confidence level difference less than the preset value, a ground mark whose similarity with a standard shape is less than a preset threshold, according to shape information of the at least two ground marks; and performing combination on the at least two ground marks, in a case that similarities between shapes of the two ground marks and the standard shape are both greater than the preset threshold.

In an embodiment, the ground marks having the same position information may also be understood as ground marks having the same spatial position, and a plurality of detection results may be obtained. Therefore, the deduplication needs to be performed on the detection results, to ensure that only one detection result is kept for one ground mark, which can also be understood that only one corresponding detection box is kept for one ground mark. In the deduplication, the confidence levels of the two are compared first. In a case that the confidence level difference is greater than the preset value, a ground mark having a higher confidence level is kept; and in a case that the difference is less than the preset value, shapes of the two are compared, and the shape consistent with the standard shape is kept. In a case that the two are similar in shape, two detection boxes are combined, and a smallest rectangular box that can contain the two detection boxes is taken as the final detected ground mark.

Furthermore, the running of a mark-extraction network model and obtaining ground mark information from the road segment map may include: running the mark-extraction network model to divide the road segment map into a plurality of road segment sub-maps; performing convolution and pooling on each of the plurality of road segment sub-maps to obtain a feature map corresponding to each of the road segment sub-maps; and extracting information about ground marks contained in the feature map from the feature map corresponding to each of the road segment sub-maps, the ground mark information including the information about the ground marks extracted from the feature map corresponding to each of the road segment sub-maps.

In an embodiment, considering that the road segment map is relatively large, the road segment map needs to be divided into the plurality of road segment sub-maps when extracting the ground marks. Processes related to convolution, pooling and extraction of the ground mark information can be understood with reference to corresponding descriptions in FIG. 6. However, in a process that the mark-extraction network model extracts the ground marks, unknown quantities as variable coefficients in the mark-extraction network model have been obtained by training sample data at a model training stage. Therefore, variables therein, that is, the ground mark information, can be determined in the process that the mark-extraction network model extracts the ground marks.

Figure 8:
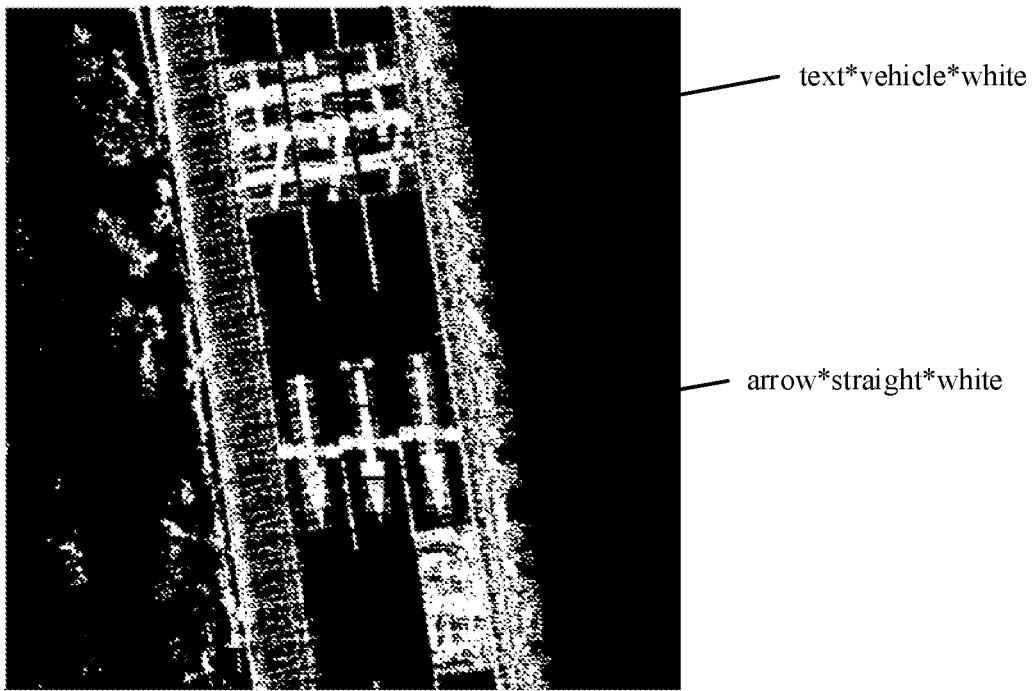
FIG. 8 is a schematic diagram of a mark extraction result in a grayscale image according to an embodiment.

An example extraction result of the ground marks is shown in FIG. 8. As shown in FIG. 8, through the mark-extraction network model, the detected ground mark can be framed by using the detection box, and the type, the color, the shape, and the like of the ground mark can be marked. As shown in FIG. 8, a mark made for a ground mark "vehicle" is "text*vehicle*white", indicating that the ground mark is text, the content of the text is vehicle, and the color of the ground mark is white. A mark made for a ground mark of an arrow is "arrow*straight*white", indicating that the ground mark is an arrow, the shape of the arrow is straight, and the color of the arrow is white.

Furthermore, the obtaining of a point cloud grayscale image may include: obtaining a three-dimensional laser point cloud map; and performing coordinate transformation according to a yaw of a vehicle in a case of obtaining the three-dimensional laser point cloud map, performing orthographic projection on a transformed three-dimensional laser point cloud map, and normalizing reflectance values of laser points in the three-dimensional laser point cloud map into grayscale values to obtain a two-dimensional point cloud grayscale image.

According to an embodiment, to more accurately determine the ground marks, it may be necessary to turn the ground marks in the point cloud grayscale image to be positive. First, the coordinate transformation is performed on the three-dimensional laser point cloud according to a direction of a driving track to obtain a positive point cloud grayscale image, and a conversion formula is as follows:

$$\begin{bmatrix} \overline{X} \\ \overline{Y} \end{bmatrix} = \begin{bmatrix} \cos\theta & -\sin\theta \\ \sin\theta & \cos\theta \end{bmatrix} \begin{bmatrix} X \\ Y \end{bmatrix} \quad (1)$$

Here, $\theta$ represents a yaw of a vehicle, $\overline{X}$ represents a two-dimensional horizontal ordinate, $\overline{Y}$ represents a two-dimensional vertical ordinate, $X$ represents a three-dimensional horizontal ordinate, and $Y$ represents a three-dimensional vertical ordinate. Then orthographic projection is performed on the transformed three-dimensional laser point cloud, and the reflectance values of the point cloud are normalized into grayscale values of 0 to 255 to obtain the two-dimensional point cloud grayscale image.

Figure 9:
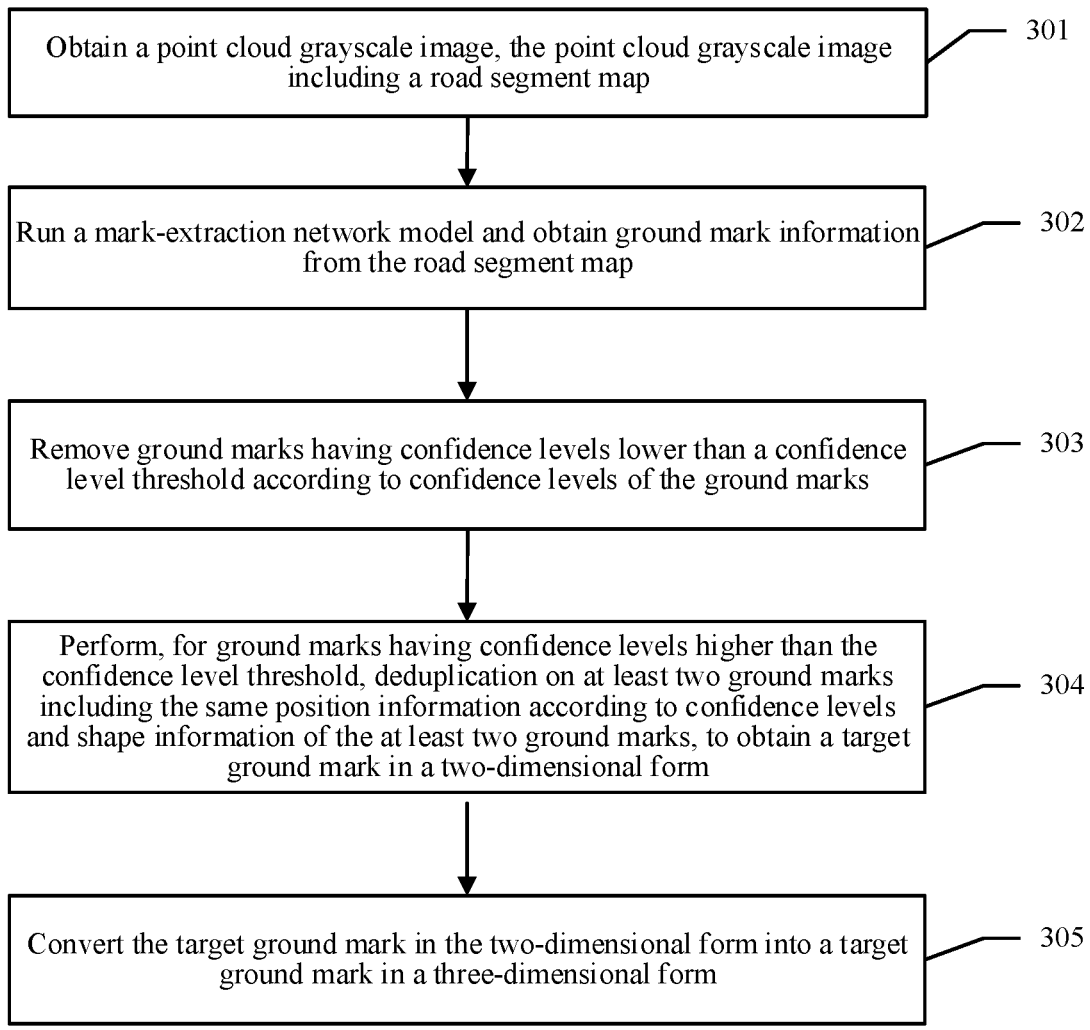
FIG. 9 a flowchart of a ground mark determining method according to an embodiment.

FIG. 9 a flowchart of a ground mark determining method according to an embodiment. The ground mark determining method may include the following steps.

In step 301, the method may include obtaining a point cloud grayscale image, the point cloud grayscale image including a road segment map.

Also, the step 301 may include obtaining a three-dimensional laser point cloud map, and converting the three-dimensional laser point cloud map into a two-dimensional grayscale image according to a conversion formula of the foregoing coordinates X̄, Ȳ, X and Y, and an angle θ.

In step 302, the method may include running a mark-extraction network model and obtaining ground mark information from the road segment map.

A process of extracting ground marks through a mark-extraction network model to obtain the ground mark information can be understood with reference to a process of performing convolution and pooling on grayscale images in FIG. 6. Here, the only difference is that, the mark-extraction network model has determined unknown quantities as variable coefficients through the foregoing training. Therefore, in the process of extracting the ground marks, the ground marks can be detected efficiently and the ground mark information can be obtained according to detection of the road segment map in the grayscale images for which the ground marks need to be determined, and detection results can be understood with reference to an example in FIG. 8.

In step 303, the method may include removing ground marks having confidence levels lower than a confidence level threshold according to confidence levels of the ground marks.

Incorrect detection results that need to be filtered after the ground marks are extracted. Each of the detected ground marks has a corresponding confidence level, the detection results having confidence levels lower than the confidence level threshold are filtered, and the detection results having confidence levels higher than the confidence level threshold are kept. Then other incorrect detection results can also be filtered according to the type and the shape of detection boxes. For example, there are several fixed ratios of the length to the width of an arrow. In a case that there is a large difference between a detection result and the fixed ratios, the detection result is to be filtered out.

In step 304, the method may include performing, for ground marks having confidence levels higher than the confidence level threshold, deduplication on at least two ground marks including the same position information according to confidence levels and shape information of the at least two ground marks to obtain a target ground mark in a two-dimensional form.

The ground marks having the same position information may also be understood as ground marks having the same spatial position, and a plurality of detection results may be obtained. Therefore, the deduplication needs to be performed on the detection results to ensure that only one detection result is kept for one ground mark. In other words, only one corresponding detection box is kept for one ground mark. In the deduplication, the confidence levels of the two are compared first. In a case that the confidence level difference is greater than the preset value, a ground mark having a higher confidence level is kept; and in a case that the difference is less than the preset value, shapes of the two are compared, and the shape consistent with the standard shape is kept. In a case that the two are similar in shape, two detection boxes are combined, and a smallest rectangular box that can contain the two detection boxes is taken as the final detected ground mark.

In step 305, the method may include converting the target ground mark in the two-dimensional form into a target ground mark in a three-dimensional form.

A detection result of the ground marks based on two-dimensional images is two-dimensional, and needs to be converted into the three-dimensional form to be represented in a high-precision map. A two-dimensional ground mark detection box can be converted into three-dimensional data according to a space mapping relationship between two-dimensional image data and three-dimensional laser point cloud data. The mapping relationship can be obtained by performing reverse conversion on the relationship of the foregoing coordinates X̄, Ȳ, X, and Y, and an angle θ.

Based on the above steps, automatic extraction of the ground marks based on the point cloud grayscale image can be performed to obtain high-precision ground mark data.

The embodiments of the disclosure takes into account of shortcomings of the current ground mark extraction method, and implements an efficient and robust ground mark extraction method. The method can automatically extract the ground mark data and category attributes thereof from the laser point cloud grayscale images quickly and accurately, thereby providing high-precision data for autonomous driving. The embodiments of the disclosure can greatly improve automatic extraction efficiency and extraction accuracy of the ground marks, and reduce production costs of the high-precision map, thereby improving an output of the high-precision map.

In the embodiments described above, the method for training a mark-extraction network model and the ground mark determining method according to the embodiments are described. An apparatus for training a mark-extraction network model and a ground mark determining apparatus according to the embodiments will be described below.

Figure 10:
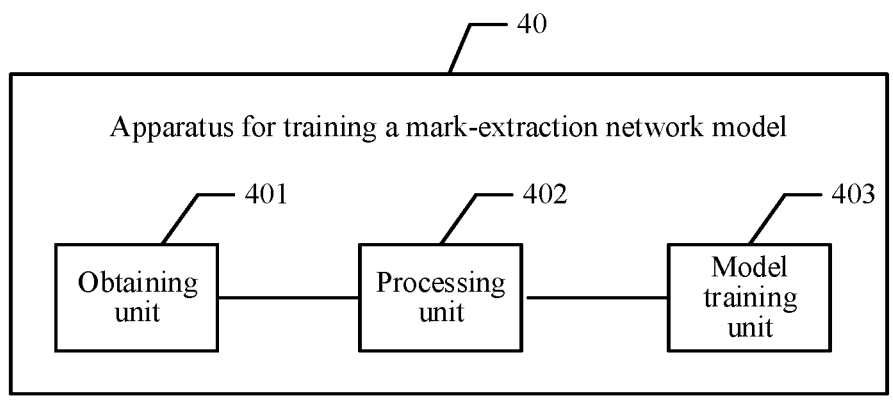
FIG. 10 is a schematic diagram of an apparatus for training a mark-extraction network model according to an embodiment.

FIG. 10 is a schematic diagram of an apparatus for training a mark-extraction network model according to an embodiment. As shown in FIG. 10, an apparatus 40 for training a mark-extraction network model includes: an obtaining unit 401 configured to obtain a plurality of sample grayscale images, each of the plurality of sample grayscale images including a road segment map, and each of road segment maps including marked ground marks; a processing unit 402 configured to perform convolution and pooling on each of the road segment maps obtained by the obtaining unit 401, to obtain a feature map of each of the road segment maps; and a model training unit 403 configured to train an initial network model until the initial network model converges, according to the marked ground marks in the feature map of each of the road segment maps obtained by the processing unit 402 through processing, to obtain the mark-extraction network model used for recognizing ground marks.

The model training solution provided according to this embodiment may train a deep neural network model used for extracting the ground marks, thereby efficiently and accurately extracting the ground marks.

The processing unit 402 is configured to divide each of the road segment maps into a plurality of road segment sub-maps; and perform the convolution and the pooling on each of the plurality of road segment sub-maps, to obtain a feature map corresponding to each of the road segment sub-maps The model training unit 403 is configured to train the initial network model until the initial network model converges, according to the marked ground marks in the feature map corresponding to each of the road segment sub-maps, to obtain the mark-extraction network model used for recognizing the ground marks.

Figure 11:
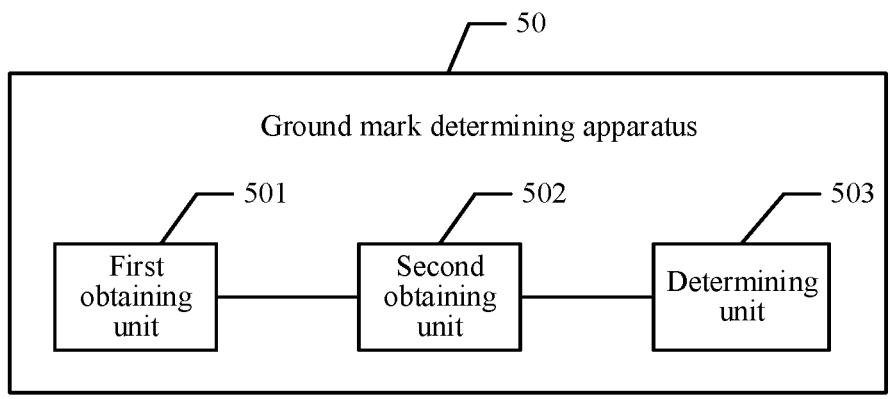
FIG. 11 is a schematic diagram of a ground mark determining apparatus according to an embodiment.

FIG. 11 is a schematic diagram of a ground mark determining apparatus according to an embodiment. As shown in FIG. 11, a ground mark determining apparatus 50 according to an embodiment may include: a first obtaining unit 501 configured to obtain a point cloud grayscale image, the point cloud grayscale image including a road segment map; a second obtaining unit 502 configured to run a mark-extraction network model and obtain ground mark information from the road segment map obtained by the first obtaining unit 501, the mark-extraction network model being used for extracting ground marks contained in the road segment map, the ground mark information including information about the ground marks extracted by the mark-extraction network model, and the ground marks being driving indication information marked on a road segment surface; and a determining unit 503 configured to determine a target ground mark from the ground marks according to the ground mark information obtained by the second obtaining unit 502.

The embodiments use the mark-extraction network model to obtain the ground mark information in the road segment maps, and determine the ground marks in the road segment maps according to the ground mark information, thereby improving efficiency and accuracy of the ground marks in the road segment maps.

The determining unit 503 is configured to remove unqualified ground marks from the ground marks according to confidence levels and attribute information of the ground marks, in a case that the ground mark information includes the attribute information and the confidence levels of the ground marks, to obtain the target ground mark in a two-dimensional form; and convert the target ground mark in the two-dimensional form into a target ground mark in a three-dimensional form.

The determining unit 503 is configured to: remove ground marks having confidence levels lower than a confidence level threshold according to the confidence levels of the ground marks in a case that the attribute information includes position information and shape information; and perform, for ground marks having confidence levels higher than the confidence level threshold, deduplication on at least two ground marks including the same position information according to confidence levels and shape information of the at least two ground marks, to obtain the target ground mark in the two-dimensional form.

Furthermore, the determining unit 503 is configured to: calculate, for the at least two ground marks including the same position information, a confidence level difference between every two of the at least two ground marks; delete, for the at least two ground marks having a confidence level difference greater than a preset value, a ground mark having a lower confidence level; delete, for the at least two ground marks having a confidence level difference less than the preset value, a ground mark whose similarity with a standard shape is less than a preset threshold, according to shape information of the two ground marks; and perform combination on the two ground marks, in a case that similarities between shapes of the at least two ground marks and the standard shape are both greater than the preset threshold.

In addition, the second obtaining unit 502 is configured to: run the mark-extraction network model, to divide the road segment map into a plurality of road segment sub-maps; perform convolution and pooling on each of the plurality of road segment sub-maps, to obtain a feature map corresponding to each of the road segment sub-maps; and extract information about ground marks contained in the feature map from the feature map corresponding to each of the road segment sub-maps, the ground mark information including the information about the ground marks extracted from the feature map corresponding to each of the road segment sub-maps.

The first obtaining unit 501 is configured to: obtain a three-dimensional laser point cloud map; and perform coordinate transformation according to a yaw of a vehicle in a case of obtaining the three-dimensional laser point cloud map, perform orthographic projection on a transformed three-dimensional laser point cloud map, and normalize reflectance values of laser points in the three-dimensional laser point cloud map into grayscale values, to obtain a two-dimensional point cloud grayscale image.

In this embodiment, functions of the apparatus 40 for training a mark-extraction network model and the ground mark determining apparatus 50 can be understood with reference to corresponding descriptions in the foregoing method embodiments.

A physical machine form of the apparatus 40 for training a mark-extraction network model and the ground mark determining apparatus 50 can be a computer device. An implementation process of the solutions of the embodiments in the computer device is described below with reference to FIG. 12.

Figure 12:
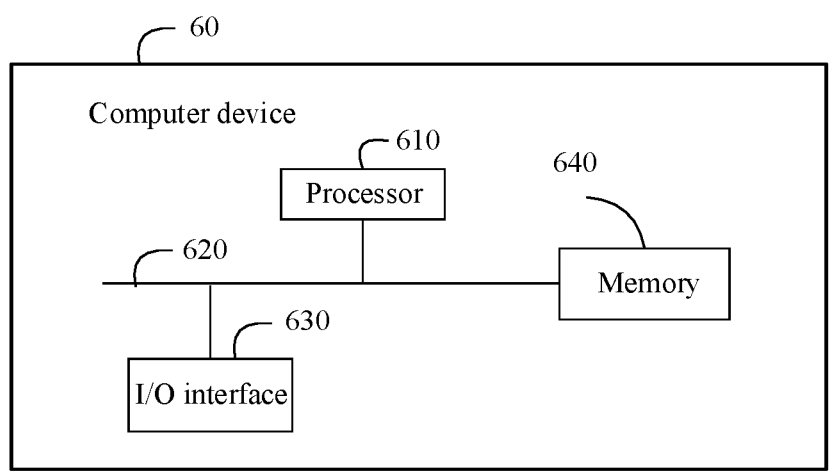
FIG. 12 is a schematic diagram of a computer device according to an embodiment.

FIG. 12 is a schematic structural diagram of a computer device 60 according to an embodiment. The computer device 60 includes a processor 610, a memory 640 and an input/output (I/O) interface 630. The memory 640 may include a read-only memory and a random access memory, and provide an operation instruction and data to the processor 610. A part of the memory 640 may further include a non-volatile random access memory (NVRAM).

In some implementations, the memory 640 stores the following elements, executable code, module or data structures, or a subset thereof, or an extended set thereof.

In an embodiment, in a process of determining ground marks, by calling an operation instruction stored in the memory 640 (the operation instruction can be stored in an operating system), a point cloud grayscale image is obtained, the point cloud grayscale image including a road segment map; a mark-extraction network model operates, and ground mark information is obtained from the road segment map, the mark-extraction network model being used for extracting ground marks contained in the road segment map, the ground mark information including information about the ground marks extracted by the mark-extraction network model, and the ground marks being driving indication information marked on a road segment surface; and a target ground mark is determined from the ground marks according to the ground mark information.

The embodiments use the mark-extraction network model to obtain the ground mark information in the road segment maps, and determine the ground marks in the road segment maps according to the ground mark information, thereby improving efficiency and accuracy of the ground marks in the road segment maps.

The processor 610 controls an operation of the computer device 60, and the processor 610 may also be referred to as a central processing unit (CPU). The memory 640 may include a read-only memory and a random access memory, and provide an instruction and data to the processor 610. A part of the memory 640 may further include a non-volatile random access memory (NVRAM). In an application, components of the computer device 60 are coupled together by using a bus system 620. In addition to a data bus, the bus system 620 may also include a power bus, a control bus, a status signal bus, and the like. However, for ease of clear description, all types of buses are referred to as the bus system 620.

The method according to an embodiment of the disclosure may be applied to the processor 610 or implemented by the processor 610. The processor 610 may be an integrated circuit chip, having a signal processing capability. In an implementation process, steps of the foregoing method may be performed through an integrated logic circuit of hardware in the processor 610 or an instruction in the form of software. The processor 610 may be a general purpose processor, a digital signal processor (DSP), an application-specific integrated circuit (ASIC), a field-programmable gate array (FPGA) or another programmable logic device, a discrete gate or a transistor logic device, or a discrete hardware component. The processor may implement or perform the methods, the steps and the logical block diagrams that are disclosed in the embodiments of the disclosure. The general purpose processor may be a microprocessor or the like. The methods according to the embodiments of the disclosure may be directly performed by using a hardware decoding processor, or may be performed and completed by using a combination of hardware and software modules in the decoding processor. The software module may be located in a mature storage medium in the art, such as a random access memory, a flash memory, a read-only memory, a programmable read-only memory, an electrically erasable programmable memory, or a register. The storage medium is located in the memory 640, and the processor 610 reads information in the memory 640 and completes the steps in the foregoing methods in combination with hardware of the processor.

The processor 610 is further configured to: remove unqualified ground marks from the ground marks according to confidence levels and attribute information of the ground marks in a case that the ground mark information includes the attribute information and the confidence levels of the ground marks, to obtain the target ground mark in a two-dimensional form; and convert the target ground mark in the two-dimensional form into a target ground mark in a three-dimensional form.

The processor 610 is further configured to: remove ground marks having confidence levels lower than a confidence level threshold according to the confidence levels of the ground marks in a case that the attribute information includes position information and shape information; and perform, for ground marks having confidence levels higher than the confidence level threshold, deduplication on at least two ground marks including the same position information according to confidence levels and shape information of the at least two ground marks, to obtain the target ground mark in the two-dimensional form.

The processor 610 is further configured to: calculate, for the at least two ground marks including the same position information, a confidence level difference between every two of the at least two ground marks; delete, for the at least two ground marks having a confidence level difference greater than a preset value, a ground mark having a lower confidence level; delete, for the at least two ground marks having a confidence level difference less than the preset value, a ground mark whose similarity with a standard shape is less than a preset threshold, according to shape information of the two ground marks; and perform combination on the at least two ground marks, in a case that similarities between shapes of the two ground marks and the standard shape are both greater than the preset threshold.

The processor 610 is further configured to: run the mark-extraction network model to divide the road segment map into a plurality of road segment sub-maps; perform convolution and pooling on each of the plurality of road segment sub-maps, to obtain a feature map corresponding to each of the road segment sub-maps; and extract information about ground marks contained in the feature map from the feature map corresponding to each of the road segment sub-maps, the ground mark information including the information about the ground marks extracted from the feature map corresponding to each of the road segment sub-maps.

The processor 610 is further configured to: obtain a three-dimensional laser point cloud map; and perform coordinate transformation according to a yaw of a vehicle in a case of obtaining the three-dimensional laser point cloud map, perform orthographic projection on a transformed three-dimensional laser point cloud map, and normalize reflectance values of laser points in the three-dimensional laser point cloud map into grayscale values, to obtain a two-dimensional point cloud grayscale image.

In a process of training the mark-extraction network model, the processor 610 is configured to: obtain a plurality of sample grayscale images, each of the plurality of sample grayscale images including a road segment map, and each of road segment maps including marked ground marks; perform convolution and pooling on each of the road segment maps, to obtain a feature map of each of the road segment maps; and train an initial network model until the initial network model converges, according to the marked ground marks in the feature map of each of the road segment maps, to obtain the mark-extraction network model used for recognizing ground marks.

The processor 610 is further configured to: divide each of the road segment maps into a plurality of road segment sub-maps; perform convolution and pooling on each of the plurality of road segment sub-maps to obtain a feature map corresponding to each of the road segment sub-maps; and train the initial network model until the initial network model converges, according to the marked ground marks in the feature map corresponding to each of the road segment sub-maps, to obtain the mark-extraction network model used for recognizing the ground marks.

The above descriptions of the computer device 60 can be understood with reference to descriptions in FIG. 1 to FIG. 9.

All or some of the foregoing embodiments may be implemented by using software, hardware, firmware, or any combination thereof. When software is used for implementation, all or some of the embodiments may be implemented in a form of a computer program product.

The computer program product includes one or more computer code or instructions. When the computer program instructions are loaded and executed on a computer, all or some of the processes or functions according to the embodiments of the disclosure may be performed. The computer may be a general-purpose computer, a dedicated computer, a computer network, or another programmable apparatus. The computer instruction may be stored in a computer-readable storage medium or may be transmitted from a computer-readable storage medium to another computer-readable storage medium. For example, the computer instruction may be transmitted from a website, computer, server, or data center to another website, computer, server, or data center in a wired (such as a coaxial cable, an optical fiber, or a digital subscriber line (DSL)) or wireless (such as infrared, radio, or microwave) manner. The computer-readable storage medium may be any usable medium accessible by a computer, or a data storage device, such as a server or a data center, integrating one or more usable media. The usable medium may be a magnetic medium (for example, a soft disk, a hard disk, or a magnetic tape), an optical medium (for example, a DVD), a semiconductor medium (for example, a solid state disk Solid State Disk (SSD)), or the like.

A person of ordinary skill in the art may understand that all or part of the steps of all methods of the foregoing embodiments may be implemented by a program instructing related hardware. The program may be stored in a computer-readable storage medium, and the storage medium may include a ROM, a RAM, a magnetic disk, an optical disc, or the like.

The above describes the ground mark determining method and apparatus, the method and apparatus for training a mark-extraction network model, and the computer-readable storage medium according to the embodiments. The foregoing embodiments only describes some embodiments of the disclosure, and the embodiments herein should not be understood as a limitation to the scope of the disclosure. A person of ordinary skill in the art may derive variations and improvements without departing from the spirit of the disclosure, and the variations and improvements belong to the protection of the present disclosure.

What is claimed is:

1. A ground mark determining method, performed by a computer device, the method comprising:
    obtaining, by the computer device, a point cloud grayscale image, the point cloud grayscale image comprising a road segment map;
    obtaining, by the computer device, ground mark information from the road segment map and running a mark-extraction network model to extract ground marks in the road segment map, the ground mark information comprising information about the ground marks extracted by the mark-extraction network model, and the ground marks indicating driving information marked on a road segment surface; and
    determining, by the computer device, a target ground mark from the ground marks according to the ground mark information,
    wherein the determining comprises performing, by the computer device, a deduplication on at least two ground marks having same position information and same shape information to obtain the target ground mark.

2. The method according to claim 1, wherein the ground mark information comprises attribute information and confidence levels of the ground marks; and
    wherein the determining the target ground mark from the ground marks according to the ground mark information comprises:
        removing, by the computer device, unqualified ground marks from the ground marks based on the confidence levels and the attribute information of the ground marks to obtain the target ground mark in a two-dimensional form; and
        converting, by the computer device, the target ground mark in the two-dimensional form into a target ground mark in a three-dimensional form.

3. The method according to claim 2, wherein the attribute information comprises position information and shape information; and
    wherein the removing the unqualified ground marks from the ground marks based on the confidence levels and the attribute information of the ground marks to obtain the target ground mark in the two-dimensional form comprises:
        removing, by the computer device, ground marks having confidence levels lower than a confidence level threshold according to the confidence levels of the ground marks; and
        performing, by the computer device, for ground marks having confidence levels higher than the confidence level threshold, the deduplication on the at least two ground marks comprising the same position information and the same shape information to obtain the target ground mark in the two-dimensional form.

4. The method according to claim 3, wherein the performing, by the computer device, the deduplication on the at least two ground marks comprising the same position information and shape information comprises:
    calculating, by the computer device, for the at least two ground marks comprising the same position information, a confidence level difference between the at least two ground marks;
    deleting, by the computer device, for the at least two ground marks having the confidence level difference greater than a preset value, one of the at least two ground marks having a lower confidence level;
    deleting, by the computer device, for the at least two ground marks having the confidence level difference less than the preset value, one of the at least two ground marks having a similarity to a standard shape that is less than a preset threshold based on the shape information of the one of the at least two ground marks; and
    performing, by the computer device, a combination of the at least two ground marks based on determining that the similarity between shapes of the at least two ground marks and the standard shape are both greater than the preset threshold.

5. The method according to claim 1, wherein the obtaining the ground mark information from the road segment map and running the mark-extraction network model further comprises:
    running, by the computer device, the mark-extraction network model to divide the road segment map into a plurality of road segment sub-maps;
    performing, by the computer device, a convolution and a pooling on each of the plurality of road segment sub-maps to obtain a plurality of feature maps corresponding to each of the plurality of road segment sub-maps; and
    extracting, by the computer device, the ground mark information in the plurality of feature maps corresponding to each of the road segment sub-maps.

6. The method according to claim 1, wherein the obtaining the point cloud grayscale image comprises:
    obtaining, by the computer device, a three-dimensional laser point cloud map; and
    performing, by the computer device, a coordinate transformation according to a yaw of a vehicle based on the three-dimensional laser point cloud map, performing an orthographic projection on the transformed three-dimensional laser point cloud map, and normalizing reflectance values of laser points in the three-dimensional laser point cloud map into grayscale values to obtain a two-dimensional point cloud grayscale image.

7. The method according to claim 1, the method further comprising:
    training the mark-extraction network model;
    wherein the training the mark-extraction network model comprises:
        obtaining, by the computer device, a plurality of sample grayscale images, each of the plurality of sample grayscale images comprising a sample road segment map including sample ground marks;
        performing, by the computer device, a convolution and a pooling on each of a plurality of sample road segment maps to obtain a sample feature map of each of the plurality of sample road segment maps; and training, by the computer device, an initial network model until the initial network model converges, according to the sample ground marks in the sample feature map of each of the plurality of sample road segment maps to obtain the mark-extraction network model for recognizing the ground marks.

8. The method according to claim 7, wherein the performing the convolution and the pooling on each of the plurality of sample road segment maps to obtain the sample feature map of each of the plurality of sample road segment maps further comprises:

dividing, by the computer device, each of the plurality of sample road segment maps into a plurality of sample road segment sub-maps; and performing, by the computer device, the convolution and the pooling on each of the plurality of road segment sub-maps to obtain the plurality of sample feature maps corresponding to each of the plurality of sample road segment sub-maps, and wherein the training the initial network model until the initial network model converges further comprises:

training, by the computer device, the initial network model until the initial network model converges, according to the sample ground marks in the sample feature map corresponding to each of the plurality of sample road segment sub-maps to obtain the mark-extraction network model for recognizing the ground marks.

9. A ground mark determining apparatus, comprising:

at least one memory storing computer program code; and at least one processor configured to access the at least one memory and operate as instructed by the computer program code, the computer program code comprising:

first obtaining code configured to cause the at least one processor to obtain a point cloud grayscale image, the point cloud grayscale image comprising a road segment map;

second obtaining code configured to cause the at least one processor to obtain ground mark information from the road segment map and run a mark-extraction network model to extract ground marks in the road segment map, the ground mark information comprising information about the ground marks extracted by the mark-extraction network model, and the ground marks indicating driving information marked on a road segment surface; and determining code configured to cause the at least one processor to determine a target ground mark from the ground marks according to the ground mark information, wherein the determining code further comprises performing code configured to cause the at least one processor to perform, by the computer device, a deduplication on at least two ground marks having same position information and same shape information to obtain the target ground mark.

10. The apparatus according to claim 9, wherein the ground mark information comprises attribute information and confidence levels of the ground marks, and wherein the determining code is further configured to cause the at least one processor to:

remove unqualified ground marks from the ground marks based on the confidence levels and the attribute information of the ground marks to obtain the target ground mark in a two-dimensional form; and convert the target ground mark in the two-dimensional form into a target ground mark in a three-dimensional form.

11. The apparatus according to claim 10, wherein the attribute information comprises position information and shape information, and wherein the determining code is further configured to cause the at least one processor to:

remove ground marks having confidence levels lower than a confidence level threshold according to the confidence levels of the ground marks; and perform, for ground marks having confidence levels higher than the confidence level threshold, the deduplication on the at least two ground marks comprising the same position information and the same shape information to obtain the target ground mark in the two-dimensional form.

12. The apparatus according to claim 11, wherein the determining code is further configured to cause the at least one processor to:

calculate, for the at least two ground marks comprising the same position information, a confidence level difference between the at least two ground marks;

delete, for the at least two ground marks having the confidence level difference greater than a preset value, one of the at least two ground marks having a lower confidence level;

delete, for the at least two ground marks having the confidence level difference less than the preset value, one of the at least two ground marks having a similarity to a standard shape that is less than a preset threshold based on the shape information of the one of the at least two ground marks; and perform a combination of the at least two ground marks based on determining that the similarity between shapes of the at least two ground marks and the standard shape are both greater than the preset threshold.

13. The apparatus according to claim 9, wherein the second obtaining code is further configured to cause the at least one processor to:

run the mark-extraction network model to divide the road segment map into a plurality of road segment sub-maps;

perform a convolution and a pooling on each of the plurality of road segment sub-maps to obtain a plurality of feature maps corresponding to each of the plurality of road segment sub-maps; and extract the ground mark information in the plurality of feature maps corresponding to each of the road segment sub-maps.

14. The apparatus according to claim 9, wherein the first obtaining code is further configured to cause the at least one processor to:

obtain a three-dimensional laser point cloud map; and perform a coordinate transformation according to a yaw of a vehicle based on the three-dimensional laser point cloud map, perform an orthographic projection on the transformed three-dimensional laser point cloud map, and normalize reflectance values of laser points in the three-dimensional laser point cloud map into grayscale values to obtain a two-dimensional point cloud grayscale image.

15. The apparatus according to claim 9, further comprising:

obtaining code configured to cause the at least one processor to obtain a plurality of sample grayscale images, each of the plurality of sample grayscale images comprising a sample road segment map including sample ground marks;

processing code configured to cause the at least one processor to perform a convolution and a pooling on each of a plurality of sample road segment maps to obtain a sample feature map of each of the plurality of sample road segment maps; and model training code configured to cause the at least one processor to train an initial network model until the initial network model converges, according to the sample ground marks in the sample map of each of the plurality of sample road segment maps to obtain the mark-extraction network model for recognizing the ground marks.

16. The apparatus according to claim 15, wherein the processing code is further configured to cause the at least one processor to:

divide each of the plurality of sample road segment maps into a plurality of sample road segment sub-maps; and perform the convolution and the pooling on each of the plurality of road segment sub-maps to obtain the plurality of sample feature maps corresponding to each of the plurality of sample road segment sub-maps, and wherein the model training code is further configured to cause the at least one processor to train the initial network model until the initial network model converges, according to the sample ground marks in the sample feature map corresponding to each of the plurality of sample road segment sub-maps to obtain the mark-extraction network model for recognizing the ground marks.

17. A non-transitory computer-readable storage medium storing computer program code configured to cause at least one computer processor to:

obtain a point cloud grayscale image, the point cloud grayscale image comprising a road segment map;

obtain ground mark information from the road segment map and run a mark-extraction network model to extract ground marks in the road segment map, the ground mark information comprising information about the ground marks extracted by the mark-extraction network model, and the ground marks indicating driving information marked on a road segment surface; and determine a target ground mark from the ground marks according to the ground mark information, wherein the determining comprises performing a deduplication on at least two ground marks having same position information and same shape information to obtain the target ground mark.

18. The non-transitory computer-readable storage medium according to claim 17, wherein the ground mark information comprises attribute information and confidence levels of the ground marks, and wherein the computer program code is configured to cause the at least one processor to:

remove unqualified ground marks from the ground marks based on the confidence levels and the attribute information of the ground marks to obtain the target ground mark in a two-dimensional form; and convert the target ground mark in the two-dimensional form into a target ground mark in a three-dimensional form.

19. The non-transitory computer-readable storage medium according to claim 18, wherein the attribute information comprises position information and shape information, and wherein the computer program code is configured to cause the at least one processor to:

remove ground marks having confidence levels lower than a confidence level threshold according to the confidence levels of the ground marks; and perform, for ground marks having confidence levels higher than the confidence level threshold, the deduplication on the at least two ground marks comprising the same position information and the same shape information to obtain the target ground mark in the two-dimensional form.

20. The non-transitory computer-readable storage medium according to claim 19, wherein the computer program code is configured to cause the at least one processor to:

calculate, for the at least two ground marks comprising the same position information, a confidence level difference between the at least two ground marks;

delete, for the at least two ground marks having the confidence level difference greater than a preset value, one of the at least two ground marks having a lower confidence level;

delete, for the at least two ground marks having the confidence level difference less than the preset value, one of the at least two ground marks having a similarity to a standard shape that is less than a preset threshold based on the shape information of the one of the at least two ground marks; and perform a combination of the at least two ground marks based on determining that the similarity between shapes of the at least two ground marks and the standard shape are both greater than the preset threshold.

* * * * *